united States Patent Office 3,329,917
Patented July 4, 1967

3,329,917
RESISTOR SENSITIVE TO TEMPERATURE AND PROCESS FOR MANUFACTURING IT
Giampaolo Bolognesi, Monza, Italy, assignor to Semel S.p.A., Milan, Italy
No Drawing. Filed July 26, 1965, Ser. No. 475,016
Claims priority, application Italy, July 31, 1964, Patent 733,556
2 Claims. (Cl. 338—22)

The present invention relates to a thermistor, i.e., a resistor having electric resistance which varies considerably as a function of the temperature thereof.

According to the present invention, the resistant element of the thermistor is formed of crystal boron, both mono- and polycrystalline. Such a thermistor has remarkable advantages over heretofore used thermistors, mostly as a result of boron stability and unalterability, its high electric variation as a function of temperature and its high melting point allowing it to be used even at very high temperatures.

For preparing boron thermistors, it is suitable that the small piece of boron used have a sufficiently regular shape. Crystal boron can be reduced to suitable sized pieces by mechanical means; however, piece shape resulting from a mechanical crushing is frequently unsuitable, owing to its irregularity, to thermistor manufacturing, and consequently not all of the fragments are satisfactorily utilizable.

The present invention also relates to a method for giving a sensibly regular shape to boron fragments in manufacturing thermistor products.

To this purpose, boron fragments according to the invention are stricken by an electric arc so as to cause at least a partial melting thereof while each fragment is immersed in the arc. It has thus been found that this process can be conveniently carried out for instance as follows.

Boron fragments of an irregular shape are disposed on a metal plate; it is suitable that such a plate be of a little oxidable metal, or of a metal not originating oxides capable of forming a solution with boron. For instance, it has been found that a chrome-steel plate or a chrome-nickel stainless steep plate may be conveniently used; also an aluminium plate may be used in view of refractoriness of oxides thereof. An electric arc is then struck between the above mentioned plate and a conductive tip movable over the plate surface; thus, such an arc can be brought to strike and embrace one of the boron fragments placed on the plate, causing it to melt and assume the shape of a roundish and nearly spherical drop, which occurs within a few seconds, the size of said fragments being very small, that is in the order of a millimeter or even less; subsequently, the above tipped electrode is moved to another fragment until all of the small pieces of boron are reduced to the almost spherical shape, as above stated.

The small balls of boron thus obtained can be used as thermistors by connection of two approximate antipoles thereof to two rheophores.

This connection can be carried out in any known way; however, the invention relates also to a method for welding two conductors to a small ball of boron.

Physical properties of boron made it very difficult to weld boron with another metal; on the other hand, a weld not resisting relatively high temperatures would not allow the electric properties of boron to be profited by at such temperatures.

As to this problem, the invention starts from considering that with platinum boron yields an eutectic melting at between 900° and 1000° C.

It has thus been found that by having an electric current run through a thin platinum wire, so as to bring it to a convenient temperature, such as a bit higher temperature than 1000° C., and by contacting an eventually heated fragment or a small ball of boron prepared as above described, a diffusion of solid state platinum into the boron will be created, which at a certain moment reaches in a determined point an eutectic composition, or very close to it, that starts melting.

Then, by interrupting the electric current passage through the platinum wire, the assembly will be cooled and the very small melted part will solidify realizing a mechanical and electrical effective welding between the two parts.

Similarly, a further thin platinum wire is welded at the opposite pole of the same small ball, thus realizing the thermistor.

Of course, it is also possible to heat the small ball of boron and apply the cooled or heated platinum wire to it.

Thermistors so obtained can be covered with any protective material.

I claim:

1. A thermistor comprising a substantially spherically shaped resistant element of boron and two platinum terminals, said terminals being welded on opposite sides of said boron element.

2. A process for manufacturing a thermistor including a boron resistant element with two platinum terminal wires attached thereto comprising the steps of placing boron fragments on a plate of a metal which will not produce oxides compatible with boron, passing an electrical arc through said fragments thereby melting them and causing them to form into a spherical shape, contacting said boron with platinum terminal wires on opposing sides thereof, and passing an electrical current through said wires to bring said contact point to a temperature of substantially 1000° C. wherein a platinum-boron eutectic is formed thereby welding said wires to said boron element by mutual solution of said metals thus producing said thermistor.

References Cited

UNITED STATES PATENTS

| | | | |
|---|---|---|---|
| 2,276,864 | 3/1942 | Pearson | 338—23 |
| 2,352,056 | 6/1944 | Wilson | 338—22 |
| 2,386,903 | 10/1945 | Lutomirski | 338—23 |
| 2,389,915 | 11/1945 | Kleimack et al. | 338—22 |
| 2,391,506 | 12/1945 | Pearson | 338—22 |
| 2,778,926 | 1/1957 | Schneider | 219—117 |
| 2,793,282 | 5/1957 | Steigerwald | 219—69 |

RICHARD M. WOOD, Primary Examiner.

W. D. BROOKS, Assistant Examiner.